United States Patent [19]

Flockenhaus et al.

[11] Patent Number: 4,751,212

[45] Date of Patent: Jun. 14, 1988

[54] PROCESS FOR THE MANUFACTURE OF A CATALYST FOR THE REDUCTION OF NITROGEN OXIDES IN EXHAUST GASES

[75] Inventors: Claus Flockenhaus; Erich Hackler, both of Essen; Karl H. Laue, Hattingen; Klaus Merkel, Essen; Arnold Max, Bottrop; Werner Stender, Raesfeld; Johann Jansen, Duisburg; Hartmut Kainer, Wiesbaden; Daniel Grimm, Schlangenbad-Bärstadt; Blagoje Levkov, Wiesbaden, all of Fed. Rep. of Germany

[73] Assignees: Didier Engineering GmbH, Essen; Didier-Werke AG, Wiesbaden, both of Fed. Rep. of Germany

[21] Appl. No.: 938,525

[22] Filed: Dec. 5, 1986

[30] Foreign Application Priority Data

Dec. 12, 1985 [DE] Fed. Rep. of Germany ....... 3543858

[51] Int. Cl.⁴ .................... B01J 23/74; B01J 27/053; C01B 21/00
[52] U.S. Cl. .................... 502/338; 423/239; 502/217; 502/527
[58] Field of Search .............. 502/338, 316, 217, 527; 423/439 R, 439 A, 213.5

[56] References Cited

U.S. PATENT DOCUMENTS

| 948,947 | 2/1910 | Wrampelmeier | 502/338 |
|---|---|---|---|
| 4,070,440 | 1/1978 | Moriguchi et al. | 502/338 |
| 4,081,511 | 3/1978 | Laue et al. | 423/239 |
| 4,087,250 | 5/1978 | Laue et al. | 23/262 |
| 4,107,272 | 8/1978 | Mori et al. | 423/239 A |
| 4,132,635 | 1/1979 | Yang | 209/166 |

FOREIGN PATENT DOCUMENTS

| 2512410 | 9/1976 | Fed. Rep. of Germany . |
|---|---|---|
| 2512409 | 9/1976 | Fed. Rep. of Germany . |
| 2639848 | 12/1977 | Fed. Rep. of Germany . |
| 117388 | 9/1979 | Japan | 502/217 |

Primary Examiner—Paul E. Konopka
Attorney, Agent, or Firm—Nils H. Ljungman

[57] ABSTRACT

The invention relates to a process for the manufacture of a catalyst for the reduction of nitrogen oxides in exhaust gases. The catalyst contains a metal oxide. The catalyst is preferably used for catalytic reduction with ammonia. The process comprises screening a natural goethite iron ore to the required grain size and then treating the ore with sulfuric acid. Subsequently, the goethite iron ore is heated to a temperature which approximately equals the temperature at which it will be used in the catalytic reaction.

16 Claims, 1 Drawing Sheet

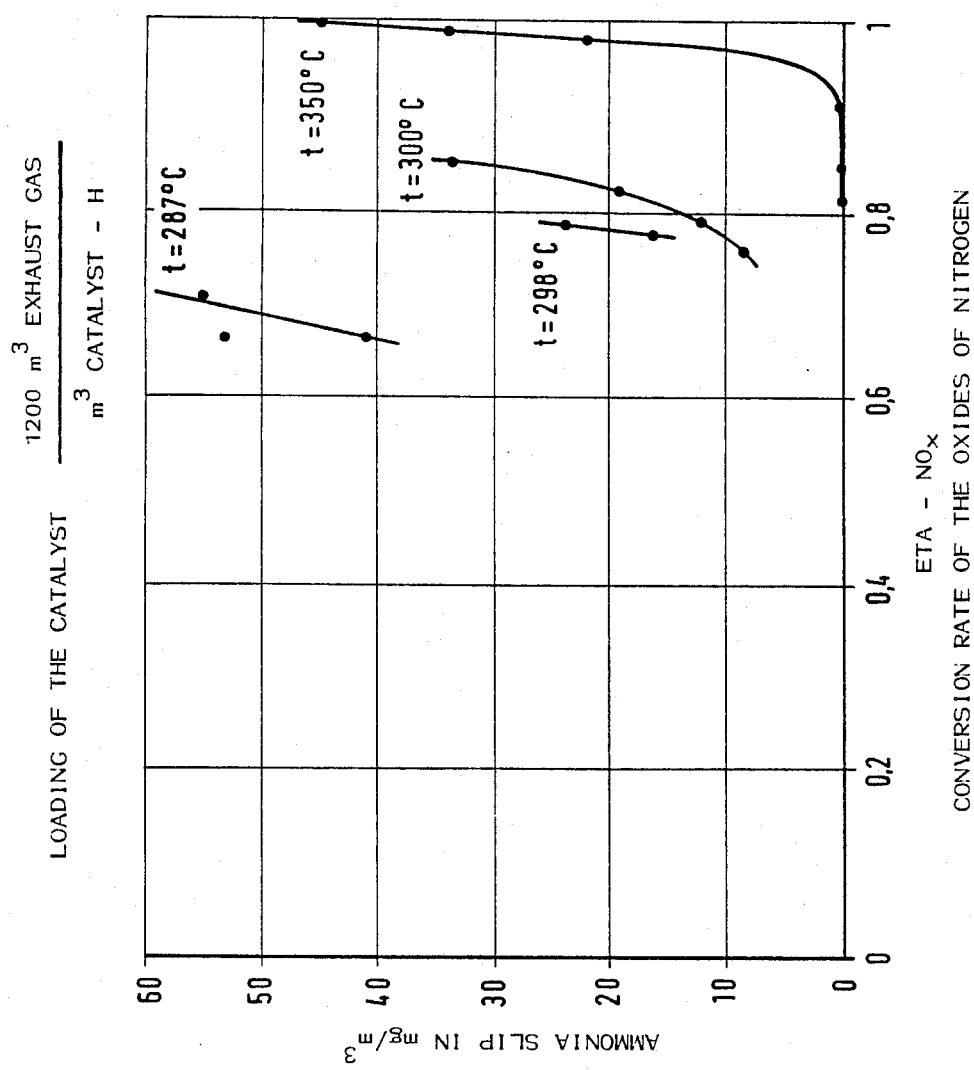

PROCESS FOR THE MANUFACTURE OF A CATALYST FOR THE REDUCTION OF NITROGEN OXIDES IN EXHAUST GASES

CROSS REFERENCE TO CO-PENDING APPLICATIONS

Co-pending application Ser. No. 06/768,417, filed on Aug. 22, 1985, entitled "Method and Apparatus for the Reactivation of a Catalyst", corresponding to Federal Republic of Germany Patent Application No. P 34 30 887.3, filed on Aug. 22, 1984, issued on Apr. 7, 1987, as U.S. Pat. No. 4,656,148; co-pending application Ser. No. 06/768,418, filed on Aug. 22, 1985, entitled "Process for Cleaning an Exhaust Gas", corresponding to Federal Republic of Germany Patent Application No. P 34 30 870.9, filed on Aug. 22, 1984, and now abandoned; co-pending application Ser. No. 06/768,508, filed on Aug. 22, 1985, entitled "Catalyst for Removal of Nitrogen Oxides from Exhaust Gases", corresponding to Federal Republic of Germany Patent Application No. P 34 30 886.5, filed on Aug. 22, 1984, issued on June 9, 1987, as U.S. Pat. No. 4,672,052; co-pending application Ser. No. 06/831,142, filed on Feb. 19, 1986, entitled "Catalyst for the Selective Reduction of Nitrogen Oxides in Waste Gases and Process for the Manufacture and Use of Such a Catalyst", corresponding to Federal Republic of Germany Patent Application No. P 35 05 648.7, filed on Feb. 19, 1985; co-pending application Ser. No. 06/860,306, filed on May 6, 1986, entitled "Process for the Removal of Nitrogen Oxides and Soot from Exhaust Gases of Machines and Combustion Installations Burning Heavy Fuel Oil", corresponding to Federal Republic of Germany Patent Application No. P 35 16 359.3, filed on May 7, 1985; co-pending application Ser. No. 06/887,366, filed on July 17, 1986, entitled "Process for the Production of Catalysts for the Reduction of Nitrogen Oxides from Exhaust Gas and Similar Chemical Air Cleaning Processes", corresponding to Federal Republic of Germany Patent Application No. P 35 26 383.0, filed on July 24, 1985; co-pending application Ser. No. 06/900,824, filed on Aug. 27, 1986, entitled "Catalyst for the Separation of Nitrogen Oxides from Combustion Exhaust Gases", corresponding to Federal Republic of Germany Patent Application No. P 35 30 544.4, filed on Aug. 27, 1985; co-pending application Ser. No. 06/905,752, filed on Sept. 9, 1986, entitled "Process for the Manufacture of Catalyst Molding", corresponding to Federal Republic of Germany Patent Application No. P 35 32 207.1, filed on Sept. 10, 1986; co-pending application Ser. No. 938,518, filed on Dec. 5, 1986, entitled "Process for the Manufacture of Catalyst Moldings from Granular Catalyst Material Such As Iron Ore or Chromium Ore with the Use of a Binder", corresponding to Federal Republic of Germany Patent Application No. P 35 44 913.6, filed on Dec. 19, 1985, all the above applications have at least one of its inventors thereof as an inventor of the present invention. Moreover, all the above-cited applications are assigned to the assignee of the present application. All the co-pending applications are incorporated herein by reference as if set forth in their entirety herein.

BACKGROUND OF THE INVENTION

1. Field of the Invention

The invention relates to a process for the manufacture of a catalyst containing metal oxide for the reduction of nitrogen oxides in exhaust gases, specifically for the reduction of nitrogen oxides in exhaust gases by catalytic reduction by means of ammonia.

2. Description of the Prior Art

The prior art includes numerous processes for the removal of nitrogen oxides from exhaust gases. Among such processes, selective catalytic reduction by means of ammonia has proven particularly effective. Various catalysts can be used, comprising primarily metal oxides. Other active substances can be added to these metal oxides. Several disadvantages of catalysts of the prior art are that they are not resistant to abrasion or to impacts. They do not exhibit a compression-proof consistency, and they are expensive to produce. The last-named disadvantage results primarily from the fact that the production of the active substances requires several complicated steps involving the treatment of the primary materials, and from the fact that special techniques must be used to obtain the desired shapes. Examples of prior art are German Pat. No. DE-PS 25 12 410 which corresponds to U.S. Pat. No. 4,087,250, entitled "Apparatus for Removing Nitric Oxides from Processing Exhaust Gases" and U.S. Pat. No. 4,081,511, entitled "Process for Removing Nitric Oxides from Processing Exhaust Gases" and German Laid Open Patent Application No. DE-OS 25 12 409, all of which are incorporated by reference as if fully set forth herein.

OBJECT OF THE INVENTION

The object of the present invention is a process of the type described above, by means of which catalyst material of a compression-proof consistency and resistant to abrasion impacts can be economically produced.

SUMMARY OF THE INVENTION

This object is achieved by the invention, in that natural goethite iron ore is screened to the required grain size and treated with sulfuric acid. After the acid treatment, the goethite iron ore is heated to a temperature which is approximately equal to the temperature at which it will be used during the catalytic reaction. It thereby becomes possible to take advantage of the fact that when goethite iron ore is heated to more than 220° C., it can be converted to $Fe_2O_3$, and also the fact that $Fe_2O_3$ exhibits a particular suitability for the catalytic reduction of nitrogen oxides from exhaust gases by means of ammonia. As a result of the acid treatment, the activity of the Fe (III) oxide is further increased by sulfation. Therefore, the process according to the invention results in an extraordinarily active, abrasion-resistant and impact-resistant catalyst material with a consistency which does not easily yield to compression and thus may be termed "compression-proof".

It is particularly advantageous if the granular goethite iron ore is smoothed, preferably after the screening and before the acid treatment, for example, by tumbling or polishing in a drum. Such a process eliminates edges of the granular material which are easily broken off. In piles, this smoothing of the catalyst material leads to a more uniform pressure loss.

Grain sizes between approximately 0.5 and 50 mm are particularly suitable for the use of the catalyst material in bulk.

The acid treatment of the goethite iron ore is preferably done by drawing the natural goethite iron ore through a sulfuric acid bath, in which the sulfuric acid develops sufficient reaction capability. The sulfuric acid bath preferably has a concentration from 25 to 96% $H_2SO_4$.

The process according to the invention is particularly well-suited for the manufacture of an SCR (Selective Catalytic Reduction) catalyst.

One aspect of the invention relates generally to a process for manufacturing a catalyst comprising at least one metal oxide, the catalyst being for reduction of oxide of nitrogen in exhaust gases. The manufacturing process comprises the steps of: (a) separating grains in a predetermined size range from an iron ore having a goethite component; (b) treating the iron ore having the geothite component which was separated in step (a) subsequently with sulfuric acid; and (c) heating the sulfuric acid treated iron ore of step (b) thereafter to a temperature in a range substantially equal to a temperature range of use for the catalyst in a catalytic reaction.

Another aspect of the invention relates generally to a process for manufacturing a catalyst comprising at least one metal oxide, the catalyst being for reduction of oxides of nitrogen in exhaust gases. The manufacturing process comprises the steps of: (a) separating grains in a predetermined size range from an iron ore having a goethite component; (b) treating the iron ore having the goethite component which was separated in step (a) subsequently with sulfuric acid; and (c) heating the sulfuric acid treated iron ore of step (b) thereafter to a temperature in a range of from about 300° C. to about 600° C.

The temperature for heating the goethite ore subsequent to treating with sulfuric acid may be in the range of 220° C. to 750° C., and in other ranges typically used in catalytic processes such as 220° C. to 1100° C., or 300° C. to 1100° C., and preferably in the range of 300° C. to 600° C. or under 500° C. Under unique conditions temperatures as low as 100° C. may be used, such as when the ore already contains large amounts of $Fe_2O_3$. The temperature ranges may also be any of the temperatures mentioned in the patents incorporated herein by reference.

BRIEF DESCRIPTION OF THE DRAWING

The drawing shows the action of such a catalyst following the removal of sulfur from exhaust gases, whereby the $NH_3$ slip is plotted as a function of the conversion rate following an exhaust gas desulfurization installation.

DESCRIPTION OF THE PREFERRED EMBODIMENTS

In the drawing a typical loading of the catalyst according to an embodiment of the invention is shown. On the ordinate axis on the left, the slip of the ammonia is shown in milligrams per cubic meter. By "slip" is meant the amount of ammonia which is not utilized in the catalytic process and which is expelled from the exhaust gas cleaning process unreacted with the oxides of nitrogen. Clearly, the rate of conversion of oxides of nitrogen for a temperature of 350° C. in the catalytic exhaust gas conversion process, even at a substantially zero slip, may be as high as about 92% to 93%. At temperatures of the exhaust gas at 287° C., 298° C. and 300° C., the conversion rates and the slips of the ammonia have different values, as shown in the drawing. The rate of flow of gas for the data in the drawing is 1200 liters per hour. This rate of flow may also be specific volume. A series of points representing the actually measured values are shown through which curves or straight lines have been drawn.

An example of the invention relates to the manufacture of a catalyst in which a natural goethite iron ore is screened to a required grain size range and then treated with sulfuric acid. After the acid treatment, the goethite iron ore is heated to a temperature which is approximately equal to the temperature at which it will be used during the catalytic reaction. When goethite iron ore is heated to more than 220° C., it can be converted to $Fe_2O_3$ which has a particular suitability for the catalytic reduction of nitrogen oxides from exhaust gases in a process using ammonia. As a result of the acid treatment, the activity of the Fe (III) oxide is further increased by sulfation. Therefore, the process according to the invention results in an extraordinarily active, abrasion-resistant and impact-resistant catalyst material with a consistency which does not easily yield to compression and thus may be termed "compression-proof".

The granular goethite iron ore is smoothed, preferably after the screening and before the acid treatment, for example, by tumbling or polishing in a drum. Such a process reduces the edges on the granular material which are easily broken off by the smoothing. When the catalyst is formed or aggregated in bulk, this smoothing provides a more uniform pressure loss.

Grain sizes having a size range between approximately 0.5 millimeters and 50 millimeters are particularly suitable for the use of the catalyst material in bulk.

The acid treatment of the goethite iron ore is preferably done by drawing the natural goethite iron ore through a sulfuric acid bath, in which the sulfuric acid develops sufficient reaction capability. The sulfuric acid bath preferably has a concentration from 25 to 96% $H_2SO_4$.

The temperature for heating the goethite ore subsequent to treating with sulfuric acid may be in the range of 220° C. to 750° C., and in other ranges typically used in catalytic processes such as 220° C. to 1100° C., or 300° C. to 1100° C., and preferably in the range of 300° C. to 600° C. or under 500° C. Under unique conditions temperatures as low as 100° C. may be used, such as when the ore already contains large amounts of $Fe_2O_3$, the temperature ranges may be any of the temperatures mentioned in the patents incorporated herein by reference.

An example of the process for making the catalyst is as follows:

Iron ore, comprising:
 approximately 20% goethite
 approximately 5% magnetite, and
 approximately 65% hematite
is screened to a grain size fraction from 6 to 10 mm and smoothed for 10 hours in a drum.

The ore is put through an acid bath of 50% $H_2SO_4$ and is sulfated in a rotary kiln at 400° C.

Some examples of catalytic technology and typical temperatures of operation of catalysts are found in U.S. Pat. No. 4,259,312, entitled "Process and Apparatus for Catalytically Reacting a Reducing Gas and Water Vapor"; U.S. Pat. No. 4,235,604, entitled "Method for Processing Coke Oven Gas"; and U.S. Pat. No. 4,049,777, entitled "Method of Waste Gas Treatment", all of which are assigned to the same assignee as the present application.

Further examples of catalytic technology are found in U.S. Pat. No. 4,448,895, entitled "Process for Preparation of Catalyst for Cleaning Exhaust Gases and Catalyst Prepared for the Process", and U.S. Pat. No. 4,503,162, entitled "Catalyst Systems for the Conversion of Gases." All the above cited patents are incorporated herein by reference as if fully set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A process for the manufacture of a catalyst for the reduction of at least one oxide of nitrogen in exhaust gases in the presence of ammonia, said process comprising the steps of:
   (a) screening a natural iron ore having a goethite component;
   (b) smoothing the screened iron ore to remove rough edges from the grains thereof;
   (c) treating the screened and smoothed iron ore obtained from step (b) in a sulfuric acid bath with sulfuric acid having a concentration of from about 25 percent to about 96 percent $H_2SO_4$; and
   (d) heating the sulfuric acid treated iron ore obtained from step (c) to a temperature in a range of about 100° C. or more and substantially equal to the temperature range for use of said catalyst.

2. The process for manufacturing a catalyst according to claim 1 wherein said iron ore is heated in step (c) to a temperature of from about 300° C. to about 600° C.

3. The process for manufacturing a catalyst according to claim 2 wherein said temperature is about 400° C.

4. The process for manufacturing a catalyst according to claim 1 wherein said smoothing comprises smoothing in a drum for about 10 hours.

5. The process for manufacturing a catalyst according to claim 1 wherein said smoothing comprises tumbling.

6. The process for manufacturing a catalyst according to claim 1 wherein said smoothing comprises polishing.

7. The process for manufacturing a catalyst according to claim 5 wherein said tumbling comprises tumbling in a drum.

8. The process for manufacturing a catalyst according to claim 1 wherein said separating comprises separating into grain sizes of about 0.5 millimeters to about 50 millimeters.

9. The process for manufacturing a catalyst according to claim 8 wherein said range of sizes comprises about 6 millimeters to about 10 millimeters.

10. The process for manufacturing a catalyst according to claim 1 wherein said acid bath comprises about 50 percent $H_2SO_4$.

11. The process for manufacturing a catalyst according to claim 1 wherein said iron ore comprises:
    about 20 percent goethite:
    about 5 percent magnetite; and
    about 65 percent hematite.

12. The process for manufacturing a catalyst according to claim 5 wherein said tumbling comprises smoothing for about 10 hours in a drum.

13. The process for manufacturing a catalyst according to claim 1 wherein said heating is performed in a rotating kiln.

14. The process for manufacturing a catalyst according to claim 3 wherein said iron ore comprises:
    about 20 percent goethite;
    about 5 percent magnetite; and
    about 65 percent hematite.

15. The process for manufacturing a catalyst according to claim 8 wherein said iron ore comprises:
    about 20 percent goethite;
    about 5 percent magnetite; and
    about 65 percent hematite.

16. A process for the manufacture of a catalyst for the reduction of at least one oxide of nitrogen in exhaust gases in the presence of ammonia, said process comprising the steps of:
    (a) screening a natural goethite iron ore to obtain a screened iron ore having grain sizes of about 0.5 millimeters to about 50 millimeters;
    (b) smoothing the screened iron ore to remove rough edges from the grains thereof;
    (c) treating the screened and smoothed iron ore obtained from step (b) in a sulfuric acid bath having a concentration of from about 25 percent to about 96 percent $H_2SO_4$; and
    (d) heating the sulfuric acid treated iron ore obtained from step (c) to a temperature in a range of from about 300° C. to about 600° C.

* * * * *